June 23, 1953
D. W. BINGHAM
2,642,795
APPARATUS FOR HEATING AND/OR COOLING
CANNED FOOD OR OTHER SUBSTANCES
Filed July 12, 1949
6 Sheets—Sheet 6
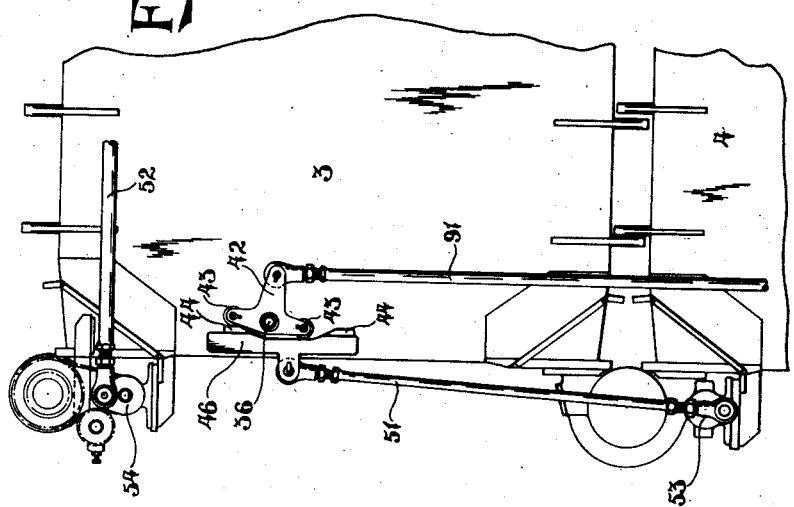
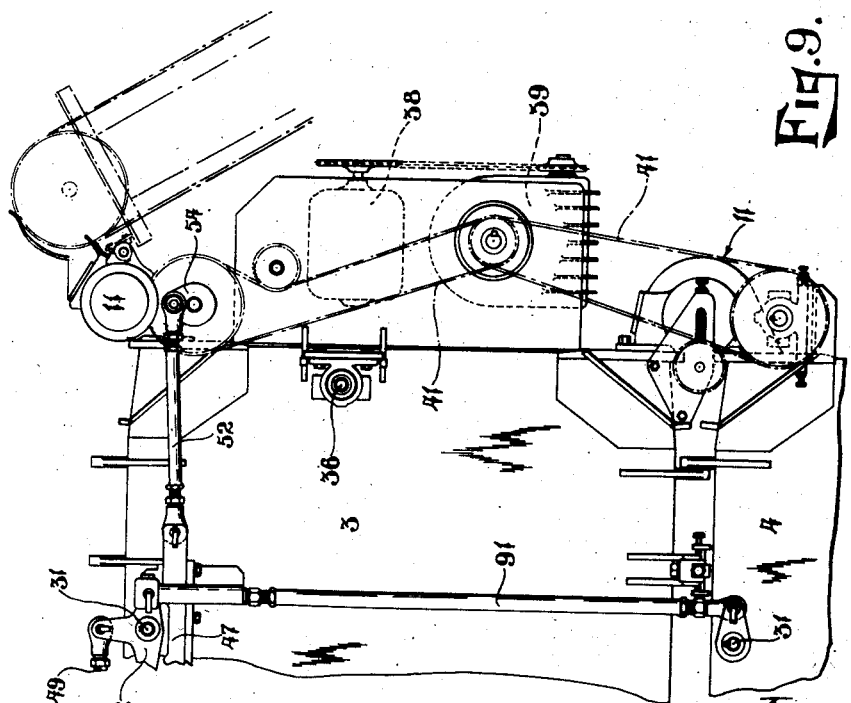
Inventor
David W. Bingham
By [signature]
Atty.

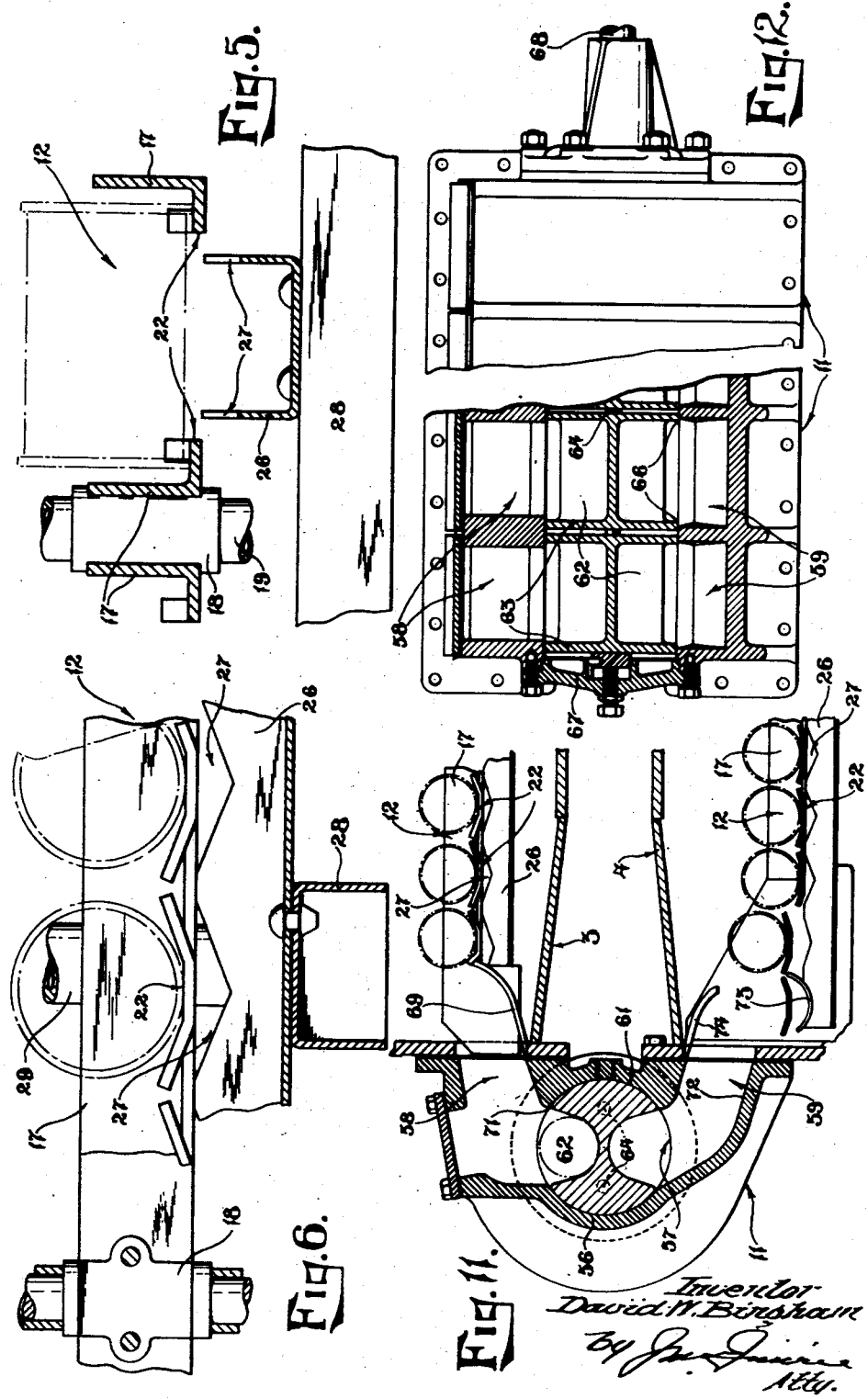

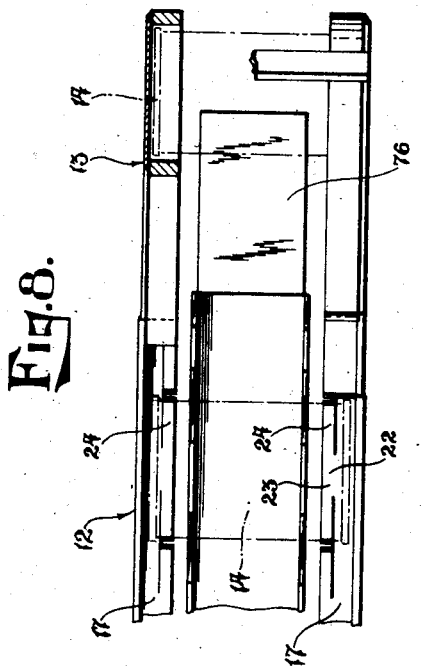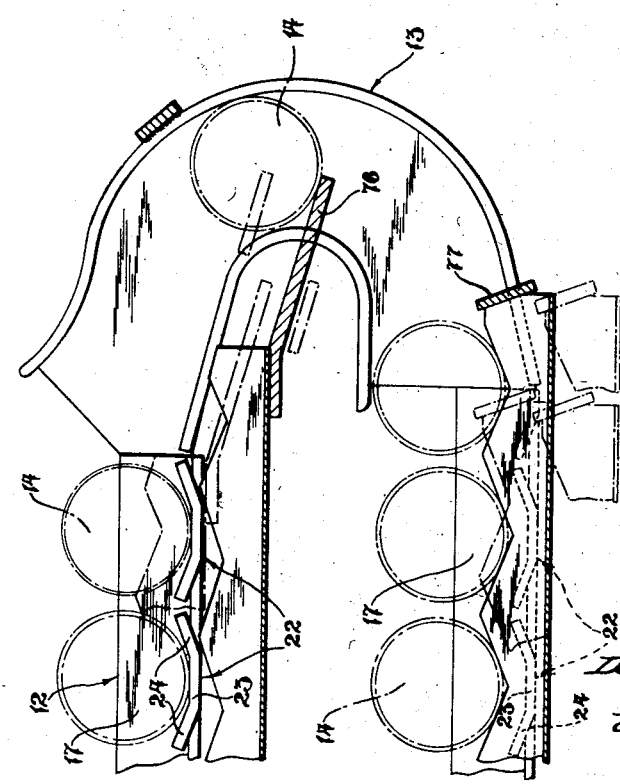

Patented June 23, 1953

2,642,795

UNITED STATES PATENT OFFICE 2,642,795

APPARATUS FOR HEATING AND/OR COOLING CANNED FOOD OR OTHER SUBSTANCES

David William Bingham, Brighton, Victoria, Australia

Application July 12, 1949, Serial No. 104,366
In Australia July 12, 1948

12 Claims. (Cl. 99—361)

This invention relates to apparatus for heating and/or cooling food or other substances that is packed in cylindrical cans or like containers and more particularly refers to that type of apparatus wherein the cans are carried successively through heating and cooling chambers and provision is made for agitating the contents of the cans whilst they are in said chambers. Such containers may be composed of metal, glass, plastic or any other suitable material but for convenience will be hereinafter referred to as cans.

Hitherto, such agitation of the food has usually been achieved by rolling the cans forward whilst the food was being cooked and subsequently cooled. Such a practice necessitated the can traversing a relatively long path in order to ensure that the food was adequately cooked. Large buildings were thus required to accommodate such cooking and cooling apparatus which was of elongated formation and relatively expensive construction.

The primary object of the present invention is to materially reduce the overall length of apparatus of the kind indicated so as to enable it to be housed in buildings of much smaller area than hitherto.

Another object is to provide in apparatus of the kind indicated, means for agitating the contents of the cans by oscillation instead of by a continuous rolling movement whereby the rate of effective forward movement of the cans is reduced and thus enables the heating and cooling treatment to be completed whilst the cans are traversing a relatively shorter path.

Another object is to provide in apparatus of the kind indicated, means for readily varying the rate of forward movement of the cans and also for regulating the degree of agitation in accordance with requirements.

Another feature of the invention is the provision of simple and efficient transfer locks through which the cans pass into and out of the heating and cooling chambers without materially varying the temperature thereof.

The improved apparatus is of less expensive design than hitherto whilst the cost of installation and maintenance is also materially reduced.

Various other objects and novel constructional features of the invention will be more readily apparent from the following description, which refers by way of example, to apparatus for cooking and cooling foodstuffs packed in cylindrical cans or like containers.

Referring to the drawings which form part of this specification:

Figure 5 is a cross section on an enlarged scale of portion of a can guideway and its associated conveyor seen in Figure 1.

Figure 6 is a longitudinal section of the parts seen in Figure 4.

Figure 7 is a sectional elevation of a transfer chute and parts associated therewith.

Figure 8 is a plan view of the parts seen in Figure 7.

Figure 9 is a side elevation of one side of the apparatus showing part of thhe driving mechanism.

Figure 10 is a similar view to Figure 9 but looking at the opposite side of the apparatus.

Figure 11 is a cross section of a transfer lock for passing the cans from the heating to the cooling chambers.

Figure 12 is a longitudinal section of the parts seen in Figure 11.

According to the present invention, the improved apparatus includes one or more substantially fluidtight housings 2 adapted to constitute a heating and a cooling chamber 3 and 4 respectively. Each housing is preferably of substantially rectangular form in cross section with opposite side, top and bottom and end walls.

Figure 1:
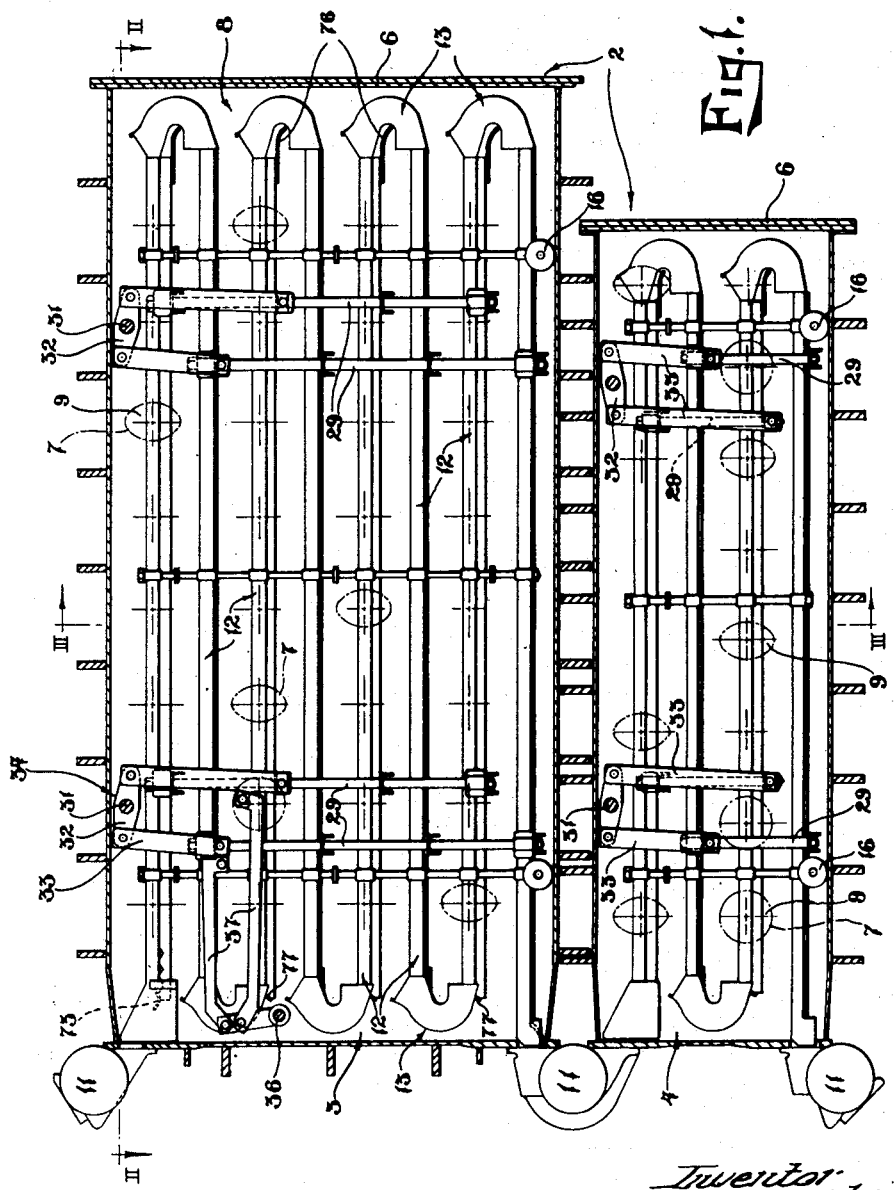
Figure 1 is a longitudinal section of apparatus in accordance with one embodiment of the present invention, parts being omitted for convenience of illustration.

It is preferred to employ separate housings for the heating and cooling chambers. As seen in Figure 1 of the drawings, these housings may be arranged in superimposed relationship although this is not essential and if an adequate floor area is available the cooling chamber may be located for example, in alignment with and at the rear of the cooking chamber if so desired.

One of the end walls 6 of each housing may be displaceable in any other suitable manner, so as to provide access to the interior of the housing. In addition, a series of vertically spaced rows of inspection and access apertures 7 are preferably provided in the opposite side walls 8 of each housing. These apertures are fitted with any suitable type of removable cover 9.

Each housing is provided with can inlet and discharge apertures which are preferably provided with fluid locks 11 hereinafter described, so as to minimise undesirable changes of temperature.

Mounted within each housing is a series of vertically spaced rows of can guideways 12 which are preferably arranged in substantially parallel formation. Transfer means such as chutes 13 are provided at the delivery ends of the guideways which lead to the next lower guideway so as to cause the cans 14 to travel lengthwise of the housing, successively in a forward and rearward direction.

Figure 2:
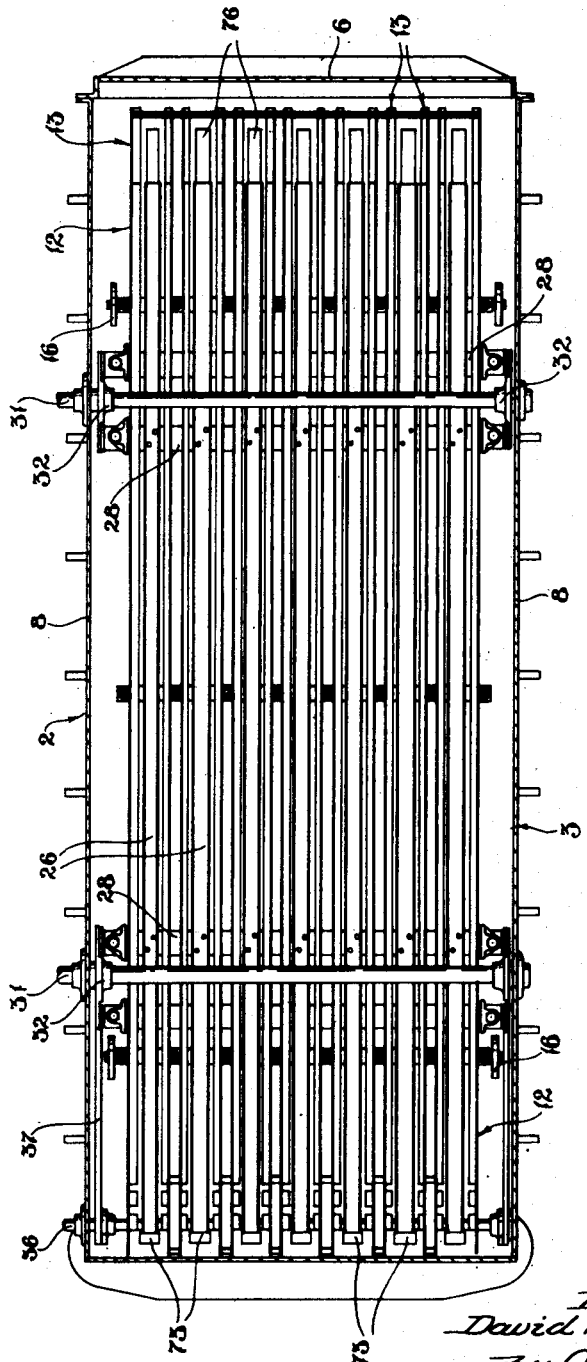
Figure 2 is a sectional plan of Figure 1 taken approximately on the line II—II.
Figure 3:
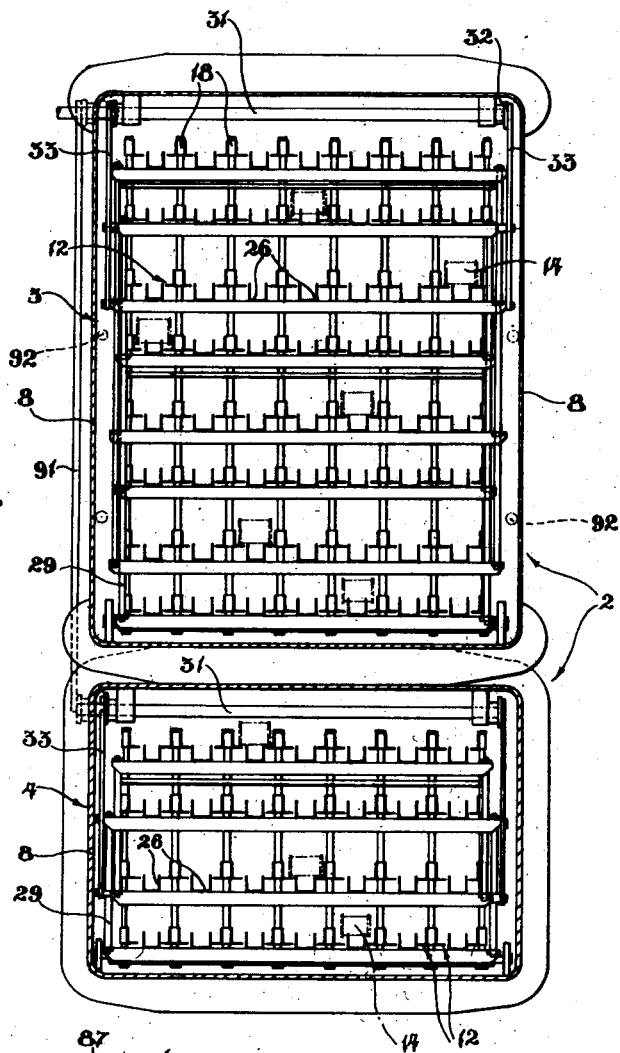
Figure 3 is a cross section taken approximately on the line III—III of Figure 1.

As shown in Figures 2 and 3 the width of each housing is such as to accommodate a series of transversely spaced guideways in each row thus enabling a maximum number of cans to be handled in a minimum area.

The rows of can guideways 12 may be constructed in the form of a portable assembly having a skeleton mounting frame including upstanding and cross frame members which may be fitted with transport rollers 16 so that the assembly may be easily moved into and out of its housing when required. Each guideway may consist of a pair of opposed rails 17 of substantially L shape in cross section and which may be supported in the desired operative position upon cross bars 18 carried by a plurality of upstanding stationary posts 19 at opposite sides of the assembly on a base member 21.

The transfer chutes 13 may be of arcuate formation when viewed from the side so as to connect the delivery end of each guideway 12 to the inlet end of the guideway immediately thereunder.

Each of the guideways is provided with a series of longitudinally spaced can seats 22 which are adapted to receive the opposite end portions of the cans and if desired cause the latter to oscillate and thus agitate contents when the can is deposited on each seating.

For this purpose, each of the can seats 22 may consist of a relatively flat central portion 23 flanked on either side with upwardly inclined shoulders 24 extending in opposite directions lengthwise of the guideway. According to one suitable method of manufacture, these can seats may be constructed by forming a series of longitudinally spaced cross cuts in the horizontal web of each of the aforesaid rails and then forming in the same web, longitudinal cuts extending in opposite directions from each cross cut. The partially severed edge portions of the web so formed are then bent up in opposite directions at the oppoiste sides of the uncut portion of the web therebetween which thus forms the flat central portion 23 of the seat. The design of each seat in relation to the diameter of the cams is such that they normally do not remain stationary on the seats but tend to oscillate thereon and thus agitate the contents of the can.

When however, it is desired to avoid or reduce oscillation to a minimum, this may be achieved by having the cans delivered onto the flat central portion 23 of each seat instead of onto the opposed shoulder 24 as aforesaid.

Associated with the foregoing are means for intermittently conveying the cans forward from seat to seat on the respective guideways and freeing the cans so as to permit them to oscillate on each seat. For this purpose, a plurality of conveyor elements 26 is provided, one between the opposed rails of each guideway 12. These conveyor elements may be carried by upright and transverse frame members which are floatingly supported on mounting means having conveyor actuating means associated therewith as hereinafter described.

Each conveyor element may be of substantially U shape in cross section and extend lengthwise of its guideway, the upstanding flanges of each conveyor element being provided in the upper edges with a series of longitudinally spaced recesses or the like 27 so as to engage each can between the opposite ends thereof whilst it is being lifted on to its next succeeding seat 22 as hereinafter described. These conveyor elements are preferably operatively connected together in two sets in such a manner that whilst the conveyor elements in the alternate vertically spaced rows are being raised the conveyor elements in the intervening rows are being lowered.

Thus the conveyor elements 26 in each row may be mounted upon a plurality of longitudinally spaced cross bars 28 which are in turn connected at their opposite ends to a plurality of upright lifting rods or the like 29. The latter are also longitudinally spaced and preferably grouped in pairs at opposite sides of the assembly with each rod carrying the conveyor elements in alternate rows only.

Elevating means are provided for alternately raising and lowering the two sets of conveyor elements and such elevating means may include a plurality of longitudinally spaced rocking shafts 31 extending transversely of the housing and passing through bearings in the side walls near the top thereof. Each rocking shaft is provided within and adjacent to these side walls with a cross arm 32 connected by pivoted links 33 or in any other suitable manner to the adjacent pair of lifting rods 29. These shafts are interconnected by linkage 34 so as to rock in unison and thus alternately raise and lower the two sets of conveyor elements as desired.

After the cans in each row are raised they are simultaneously carried forward and deposited upon the next seat 22 in their respective guideway. For this purpose, means are provided for swinging the conveyor elements 26 backwards and forwards relative to the guideways in synchronism with their rising and falling movements. Such swinging means may also include a rocking shaft 36 mounted in bearings within the housing, for example, at or adjacent to one end thereof. This rocking shaft may be connected by links and levers 37 or in any other suitable manner to the two sets of conveyor elements so as to simultaneously swing them backwards and forwards.

The rocking shafts 31, 36 of both the elevating and swinging mechanisms extend exteriorly of the housing and are operatively connected in any suitable manner so that their movements may be synchronised and they may be actuated from a common source of power such as a power driven shaft. Or if desired the apparatus may include its own power unit for example, in the form of an electric motor 38. The latter may be adapted to drive any suitable type of reduction gearing 39 which is in turn adapted to drive the various movable parts of the apparatus by means of V belts 41, gearing or in any other suitable manner.

This driving mechanism may include substantially T-shaped lever arms 42 fixed to the outer ends of the rocker shafts 31, 36, the co-aligned arms of two of the levers being preferably provided at their outer ends with anti-friction rollers 43 adapted to be engaged successively by opposed cams 44 carried by reciprocatory blocks 46, 47 which may also be fitted with anti-friction rollers 48. Similar cam mechanism may then be employed to actuate both the elevating mechanism and the swinging mechanism. The central arms of the T-shaped levers of the elevating means may be linked by connecting rods 49 whilst cam blocks 46 may be reciprocated by connecting rods 51, 52 coupled to power driven crank arms or eccentric discs 53, 54 as hereinafter described.

Each of the aforesaid fluid blocks 11 includes a casing 56 having a cylindrical chamber 57 formed therein and a series of longitudinally spaced inlet and discharge apertures 58 and 59 respectively for the cans through the side wall of the casing. A rotatable carrier 61 is mounted within the cylindrical chamber and provided with a plurality of circumferentially spaced rows of pockets 62 to receive the cans whilst they are being carried through the lock. The pockets in each row are also longitudinally spaced to register with the inlet and discharge apertures. A pair of diametrically opposed rows of pockets are preferably employed and the inlet and discharge apertures are also preferably similarly disposed in the casing so that the pockets in the carrier will simultaneously register with both apertures. Thus whilst the cans are being discharged from one line of pockets, a fresh group of cans is being received in the opposed pockets.

As seen in Figures 11 and 12 of the drawings, the rotary carrier may consist of an assembly of separate sections 63 interconnected by pins 64 or in any other suitable manner. In order to minimise friction, the rotary carrier 61 and its casing may be provided with relatively narrow circumferential bearing surfaces 66 between each pocket. The casing is provided with removable end closure plates 67 to retain the assembled sections 63 in position, one of the end sections being also connected to a power driven shaft 68 for turning the carrier.

In order to take up wear on the bearing surfaces 66, the latter are preferably tapered axially of the assembly. Thus, it is merely necessary to periodically discard the smallest diameter carrier section instead of the whole assembly and replace the largest diameter section, the size of the intervening sections being suitably reduced in accordance with requirements.

The rotary carrier 61 in the transfer lock which is positioned between the aforesaid heating and cooling chambers 3, 4 is preferably adapted to arrest the downward movement of the cans as they enter the lock through a chute 69 from the heating chamber. For this purpose, each of the pockets in the rotary carrier is preferably of substantially U shape in cross section so as to provide longitudinal shoulders 71 at the entrance to the pocket. Each of these shoulders is preferably of convex curvature in section so as to avoid damaging each can as it rolls forward and engages the shoulder and is thus temporarily arrested until the empty pocket reaches full registry with its inlet aperture 58 and permits the can to roll into the pocket. The intervening surfaces of the rotary carrier between the pockets are of part cylindrical formation and these surfaces also engage the next oncoming can in the chute and restrain its forward movement until the arrival of the next empty pocket.

A short discharge chute 72 also preferably leads from the transfer lock to the cooling chamber 4 and as the cans roll through this chute under the influence of their own weight, means are preferably provided for avoiding damage as they leave this chute. For this purpose the topmost conveyor elements 26 in the cooling chamber may each be provided with a receiving cup or the like 73 at that end adjacent to the transfer lock. Each of these receiving cups may be of arcuate formation and cooperate with an overhanging director plate 74 on the end wall of the housing associated therewith.

As the cans roll through each of the transfer chutes 13 they tend to gather speed under the influence of their own weight and therefore means are preferably provided for temporarily arresting or slowing down such forward movement of the cans through the chutes. For this purpose, one or more displaceable stop plates or the like may extend across each chute at intermediate points in the length thereof. For example, one such stop plate 76 may be carried by the conveyor element located adjacent to the top of its chute which has an apertured side wall through which the stop plates may pass. Thus during the forward lengthwise movement of each conveyor element the stop plate enters the chute and after arresting the forward movement of the can, moves downwardly along the chute before being withdrawn to free the can.

A second stop plate 77 may be carried by each conveyor element which is located adjacent to the outlet end of its transfer chute. In this case the stop plate may upstand on the end of the conveyor element and also pass through the aperture in the wall of the chute. Thus the upstanding plate engages the oncoming can before it reaches the outlet end of the chute. The stop plate is then moved rearwardly in the direction of the can movement before it descends and becomes disengaged from the can which is thus free to roll on to its first seating in the next row of guideways.

Figure 4:
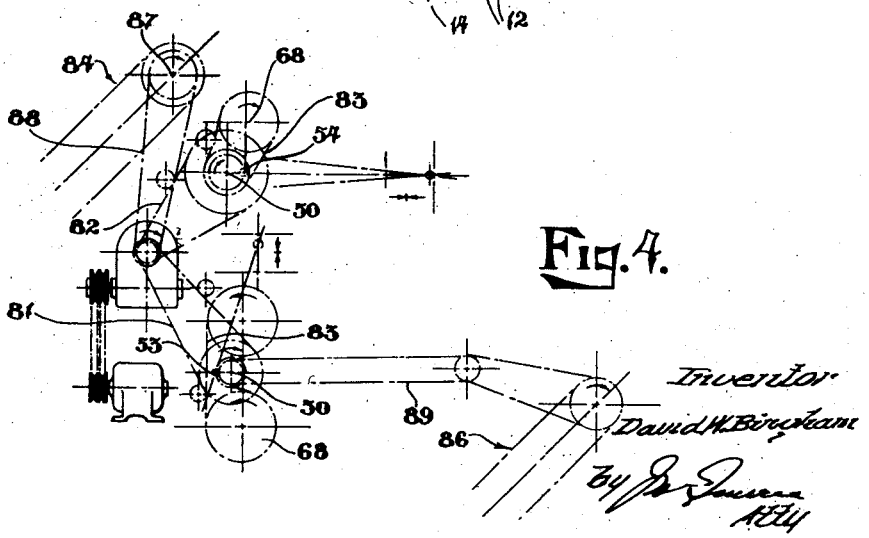
Figure 4 is a diagrammatic side view of a suitable driving arrangement for actuating the various parts of the apparatus from a common source of power.

A suitable driving arrangement is seen more clearly in Figure 4 of the drawings wherein endless chains or the like 81, 82 are employed for transmitting the drive from the reduction gearing 39 to the shafts 50 carrying the crank arms 53, 54. These crank shafts may in turn be adapted to actuate the lock shafts 68 by means of endless driving chains or the like 83.

In addition the same driving means may be employed for actuating a cam feeding elevator 84 and a discharge elevator or conveyor 86. For example, one of the feed elevator shafts 87 may be driven by an endless chain or the like 88 from the reduction gearing whilst the discharge elevator or conveyor may be driven from one of the crank shafts 50 by an endless chain 89.

If a cooling chamber 4 is employed, it is also fitted with vertically spaced rows of can guideways 12 and associated conveyor elements 26 as aforesaid. In this case, the conveyor elevating and swinging mechanism of the heating chamber may be readily adapted to actuate the conveyor elements of the cooling chamber by means of connecting rods 91 or in any other suitable manner.

If desired, the conveyor elevating and swinging mechanism may be duplicated at opposite sides of the main housing.

The aforesaid heating chamber may be adapted to function as a pressure cooker if so desired.

For this purpose it is made substantially steam tight and may be fitted with any suitable arrangement of steam pipes 92 on the interior of the walls of the chamber.

The cooling chamber may be fitted with a similar pipe system for a cooling medium.

In use, a suitable type of elevator 84 such for example as that described in my United States Patent No. 2,493,942 is employed for feeding rows of laterally spaced cans into the lock 11 at the inlet end of the heating chamber. The rows of cans simultaneously enter the pockets 62 in the rotary carrier 61 and are eventually released from the lock and permitted to pass through the inlet aperture of the heating chamber on to the topmost conveyor elements 26 which in turn deposit the row of cans on to the first seats 22 of the topmost row of guideways 12. Continued movement of the conveyor elements as aforesaid results in each can being lifted from its seating, conveyed forwardly and deposited upon the inclined side shoulder of the next seat so that when it is freed by the downward movement of the conveyor element, the can proceeds to oscillate on its seat until it is again picked up by the conveyor element and carried forward to the next seat. When each can reaches the opposite end of the top row of guideways it enters a transfer chute 13 and gravitates to the next lower row of guideways where it is carried backward in the opposite direction. Each can is thus carried forwardly and backwardly along the guideways until it has finally completed its travel through the heating chamber. The rate of forward movement of the cans is capable of being readily predetermined in order to effectively regulate the time during which the contents of the cans are subjected to heating in accordance with requirements.

When the cans have traversed the heating chamber, they enter the transfer lock and are automatically delivered into the cooling chamber 4 without permitting any material escape of heat from the heating chamber. The cans follow a similar tortuous path through the cooling chamber until they finally are discharged through a lock at the discharge end of the cooling chamber.

It will be appreciated from the foregoing, that the improved apparatus is of particularly compact design and enables a relatively large number of cans to be handled in heating and/or cooling chambers which occupy materially less space than hitherto. It will also be apparent that the improved design provides effective agitation if so desired of the contents of the cans whilst they traverse a relatively long path in a relatively confined space. The length of the guideways of both the cooking and cooling chambers plus the facility with which the forward speed of the cans may be regulated enables the apparatus to handle a wide variety of foodstuffs and other substances that require heating and/or cooling treatment after being canned.

In some instances, it is desirable for the contents of the cans to be subjected to little if any agitation whilst being supported on the can seats. This may be readily effected by suitably regulating the degree of swinging movement of the conveyor elements in such a manner as to deposit the cans on the flat central portion 23 of each seat instead of on the inclined shoulders thereof as aforesaid. The cans thus remain substantially stationary on each seating during the intervals between each forward movement on the conveyor elements.

Various alterations, modifications and/or additions may be introduced into the foregoing construction and arrangement of parts without departing from the ambit of the invention as defined in the appended claims.

Having now described my invention, what I claim as new and desire to secure by Letters Patent is:

1. Apparatus for treating canned food or other substances comprising a housing forming a treating chamber, a series of vertically spaced rows of can guideways within said housing, inlet apertures in said housings for feeding cans to one end of each series of said guideways, transfer means leading from the delivery end of each guideway to the next lower guideway, a conveyor element for moving the cans lengthwise of each guideway so as to cause the cans to travel lengthwise of said housing successively in forward and rearward directions before reaching discharge apertures in said housing at that end of the series of guideways remote from said inlet apertures, each guideway including a series of longitudinally spaced can seats upon which the cans are permitted to remain for predetermined intervals in between their forward and rearward movements along said guideways, each can guideway comprising a pair of opposed rails of substantially L shape in cross section with transversely aligned can seats on said opposed rails, said seats being located at longitudinally spaced intervals on said guideways so as to receive the opposite end portions of the cans, said conveyor means including a plurality of conveyor elements, one between the opposed rails of each guideway, each conveyor element being of substantially U shape in cross section and extending lengthwise of its guideway, the upstanding flanges of said conveyor element being provided in the upper edge portions with a series of longitudinally spaced recesses to receive said cans.

2. Apparatus for treating canned food or other substances comprising a housing forming a treating chamber, a series of vertically spaced rows of can guideways within said housing, inlet apertures in said housing for feeding cans to one end of each series of said guideways, transfer means leading from the delivery end of each guideway to the next lower guideway, a conveyor element for moving the cans lengthwise of each guideway so as to cause the cans to travel lengthwise of said housing successively in forward and rearward directions before reaching discharge apertures in said housing at that end of the series of guideways remote from said inlet apertures, each guideway including a series of longitudinally spaced can seats upon which the cans are permitted to remain for predetermined intervals in between their forward and rearward movements along said guideways, each can seat comprising a relatively flat central portion flanked on its opposite sides with upwardly inclined shoulders which extend in opposite directions lengthwise of the associated guideway, said conveyor means being capable of adjustment so that it may deposit each can either on the inclined shoulders or on the relatively flat central portions of the can seats.

3. Apparatus according to claim 2 wherein each can seat comprises a relatively flat central portion flanked on its opposite sides with upwardly inclined shoulders which extend in opposite directions lengthwise of the associated guideway, said conveyor means being capable of adjustment so that it may deposit each can either on the inclined shoulders or on the relatively flat central portions of the can seats.

4. Apparatus according to claim 2 wherein said rows of can guideways are supported by a frame that is independent of said housing, and mobile supports on said frame and adapting said frame for movement into and out of its housing.

5. Apparatus according to claim 2 wherein said conveyor means includes a plurality of conveyor elements one for each guideway, elevating means for raising and lowering said conveyor elements and means for swinging them lengthwise of their associated guideways, said conveyor elements being operatively connected together in two sets of alternate vertically spaced rows, said elevating and swinging means including mechanism operable for simultaneously actuating said two sets of conveyor elements in opposite sense so that alternate vertically spaced rows are raised above their associated guideways while in the intervening rows are lowered below their associated guideways.

6. Apparatus according to claim 2 wherein said conveyor means includes a plurality of conveyor elements one for each guideway, elevating means for raising and lowering said conveyor elements and means for swinging them lengthwise of their associated guideways, said conveyor elements being operatively connected together in two sets of alternate vertically spaced rows, said elevating and swinging means including mechanism operable for simultaneously actuating said two sets of conveyor elements in opposite sense so that alternate vertically spaced rows are raised above their associated guideways while the intervening rows are lowered below their associated guideways, said two sets of conveyor elements being floatingly supported on mounting means which include a plurality of upright and transverse frame members linked to a plurality of rocking shafts which are fitted with means for alternately raising and lowering the two sets of conveyor elements, said conveyor actuating means being operated by cam mechanism which includes pairs of opposed cams operatively engaging lever arms carried by said rocking shafts, and means for reciprocating said pairs of cams.

7. Apparatus for treating canned food or other substances comprising a housing forming a treating chamber, a series of vertically spaced rows of can guideways within said housing, inlet apertures in said housing for feeding cans to one end of each series of said guideways, transfer means leading from the delivery end of each guideway to the next lower guideway, a conveyor element for moving the cans lengthwise of each guideway so as to cause the cans to travel lengthwise of said housing successively in forward and rearward directions before reaching discharge apertures in said housing at that end of the series of guideways remote from said inlet apertures, each guideway including a series of longitudinally spaced can seats upon which the cans are permitted to remain for predetermined intervals in between their forward and rearward movements along said guideways, said transfer means comprising transfer chutes, and means movable in said chutes for temporarily arresting or slowing down the forward movement of the cans through said chutes.

8. Apparatus for treating canned food or other substances comprising a housing forming a treating chamber, a series of vertically spaced rows of can guideways within said housing, inlet apertures in said housing for feeding cans to one end of each series of said guideways, transfer means leading from the delivery end of each guideway to the next lower guideway, a conveyor element for moving the cans lengthwise of each guideway so as to cause the cans to travel lengthwise of said housing successively in forward and rearward directions before reaching discharge apertures in said housing at that end of the series of guideways remote from said inlet apertures, each guideway including a series of longitudinally spaced can seats upon which the cans are permitted to remain for predetermined intervals in between their forward and rearward movements along said guideways, said transfer means comprising transfer chutes having means associated therewith for temporarily arresting or slowing down the forward movement of the cans through said chutes, said chutes having longitudinal apertures and said can arresting means comprising displaceable stop plates periodically movable through said apertures and across and lengthwise within the chutes to temporarily arrest, slow down and then free each can as it gravitates through the chute.

9. Apparatus for treating canned food or other substances comprising a housing forming a treating chamber, a series of vertically spaced rows of can guideways within said housing, inlet apertures in said housing for feeding cans to one end of each series of said guideways, transfer means leading from the delivery end of each guideway to the next lower guideway, a conveyor element for moving the cans lengthwise of each guideway so as to cause the cans to travel lengthwise of said housing successively in forward and rearward directions before reaching discharge apertures in said housing at that end of the series of guideways remote from said inlet apertures, each guideway including a series of longitudinally spaced can seats upon which the cans are permitted to remain for predetermined intervals in between their forward and rearward movements along said guideways, said transfer means comprising transfer chutes having means associated therewith for temporarily arresting or slowing down the forward movement of the cans through said chutes, each said chute being provided with one or more longitudinal apertures and said can arresting means consisting of one or more displaceable stop plates adapted to pass through said apertures and to be moved across and lengthwise within the associated chute being withdrawn from time to time to free each can as it gravitates through the chute, two of said stop plates being provided for each chute, one of said stop plates being carried by the conveyor element located adjacent to the top of said chute whilst the second stop plate is carried by the conveyor element located adjacent to the bottom of the chute.

10. Apparatus for heating and cooling canned foods or other substances comprising two superimposed substantially fluid tight housings forming an upper heating chamber and a cooling chamber located thereunder, each of said heating and cooling chambers having can inlet and discharge apertures and containing can guideways for directing the cans from said inlet apertures to said discharge apertures, passage means between the discharge aperture of said upper chamber and the inlet aperture of said lower chamber, and fluid locks in said upper chamber inlet and said lower chamber discharge apertures and in said passage means.

11. Apparatus according to claim 10 wherein each of said fluid locks includes a casing having a cylindrical chamber formed therein and a series of longitudinally spaced inlet and discharge apertures for the cans through the side wall of the casing, a rotatable carrier mounted within the cylindrical chamber and provided with a plurality of circumferentially spaced rows of pockets which are also longitudinally spaced on said carrier so as to register with said inlet and discharge apertures of the associated casing, said rotary carrier consisting of an assembly of separable sections and means for interconnecting said sections so as to form a unit, the bearing surfaces of said rotary carrier and its associated cylindrical chamber being tapered axially.

12. Apparatus according to claim 10 wherein said passage means fluid lock comprises a transfer lock including a casing having a cylindrical chamber therein and a rotatable carrier mounted within said chamber and provided with a plurality of circumferentially spaced rows of pockets to receive the cans whilst they are being carried through said lock and means for avoiding damage to said cans as they leave said transfer lock and enter the cooling chamber, said last mentioned means comprising a series of can receiving cups each of which is of arcuate formation and is mounted upon the adjacent end of the uppermost row of conveyor elements in said cooling chamber.

DAVID WILLIAM BINGHAM.

References Cited in the file of this patent

UNITED STATES PATENTS

| Number | Name | Date |
|---|---|---|
| 337,863 | Petrie | Mar. 16, 1886 |
| 816,323 | Hellstrom | Mar. 27, 1906 |
| 1,149,647 | Harwood | Aug. 10, 1915 |
| 1,345,301 | Winchester | June 29, 1920 |
| 1,408,430 | Anderson | Mar. 7, 1922 |
| 1,491,958 | Logan | Apr. 29, 1924 |
| 1,647,530 | Lee | Nov. 1, 1927 |
| 1,795,450 | Sells | Mar. 10, 1931 |
| 1,939,426 | Wilcox | Dec. 12, 1933 |
| 1,987,414 | Omsted | Jan. 8, 1935 |
| 1,998,912 | Troy | Apr. 23, 1935 |
| 2,188,306 | Murch | Jan. 30, 1940 |
| 2,335,588 | Fox | Nov. 30, 1943 |
| 2,343,266 | Richmond | Mar. 7, 1944 |